(12) United States Patent
Lundberg et al.

(10) Patent No.: US 8,192,176 B2
(45) Date of Patent: Jun. 5, 2012

(54) HYDRAULIC FLUID SUPPLY SYSTEM HAVING ACTIVE REGULATOR

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 12/635,554

(22) Filed: Dec. 10, 2009

(65) Prior Publication Data

US 2011/0139279 A1  Jun. 16, 2011

(51) Int. Cl.
*F16H 61/48* (2006.01)

(52) U.S. Cl. ....... 417/307; 417/297; 417/540; 192/3.58; 137/495; 91/468

(58) Field of Classification Search .................. 417/307, 417/308, 302–304, 540, 297, 507; 192/3.58, 192/48.601, 85.63; 60/413; 137/495, 498; 251/30.01; 91/468
See application file for complete search history.

(56) References Cited

U.S. PATENT DOCUMENTS

| | | | |
|---|---|---|---|
| 3,834,499 A | 9/1974 | Candellero et al. | |
| 4,653,352 A | 3/1987 | Nakao et al. | |
| 4,944,202 A | 7/1990 | Gierer | |
| 5,441,459 A | 8/1995 | Inukai et al. | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |

(Continued)

FOREIGN PATENT DOCUMENTS

DE  2141564 A1  2/1973

(Continued)

*Primary Examiner* — Devon C Kramer
*Assistant Examiner* — Dominick L Plakkoottam (57) ABSTRACT

A hydraulic fluid supply system includes an active pressure regulator or feed limit valve with a flow cut-off which may be used with dual clutch transmission hydraulic control systems. The supply system includes a pump, a filter, pressure relief and filter bypass valves, an accumulator, a system pressure sensor and the active feed limit valve. The active feed limit and flow cut-off valve includes an on-off solenoid valve and a spool or logic valve having an inlet port, an outlet port, a control port, a feedback port and an exhaust port. The inlet port is supplied with pressurized hydraulic fluid and the control port is supplied with hydraulic fluid from the solenoid control valve when it is energized. A valve spool having a pair of spaced-apart lands is biased toward the control port. One side of a check valve is in fluid communication with the feedback port. The outlet port provides controlled pressure and flow of hydraulic fluid to the hydraulic control system and is in fluid communication with the other side of the check valve.

19 Claims, 4 Drawing Sheets

U.S. PATENT DOCUMENTS

| | | |
|---|---|---|
| 2005/0067251 A1 | 3/2005 | Braford, Jr. et al. |
| 2005/0107214 A1 | 5/2005 | Koenig |
| 2007/0175726 A1 | 8/2007 | Combes et al. |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2009/0000897 A1 | 1/2009 | Staudinger et al. |
| 2009/0151495 A1 | 6/2009 | Garabello et al. |
| 2009/0157271 A1 | 6/2009 | Garabello et al. |

FOREIGN PATENT DOCUMENTS

| | | |
|---|---|---|
| DE | 4117736 C1 | 5/1992 |
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004097265 A1 | 11/2004 |
| WO | WO2009037170 A1 | 3/2009 |
| WO | WO2010028745 A2 | 3/2010 |

HYDRAULIC FLUID SUPPLY SYSTEM HAVING ACTIVE REGULATOR

FIELD

The present disclosure relates to a hydraulic fluid supply system and more particularly to a hydraulic fluid supply system having an active regulator which may be used with dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and lack of a torque converter.

Control of the input clutches and selection and engagement of a particular gear by translation of a synchronizer and associated positive clutch is typically achieved by a hydraulic control system which is supplied with a flow of pressurized hydraulic fluid from a dedicated hydraulic fluid supply system. Optimum performance and operating efficiency can be achieved by utilizing active flow and pressure regulators in the hydraulic fluid supply system such that the hydraulic control system exhibits low leakage and positive and highly repeatable control and shift characteristics. The present invention is so directed.

SUMMARY

The present invention comprehends a hydraulic fluid supply system having an active pressure regulator or feed limit valve with a flow cut-off which is intended for use with dual clutch transmission hydraulic fluid control systems. The system includes a sump, a sump filter, a pump such as a gear, gerotor or other positive displacement pump, a pressure side filter, pressure relief and filter bypass valves, an accumulator, a system pressure sensor and the active feed limit valve assembly of the present invention.

The active feed limit valve and flow cut-off assembly includes an on-off solenoid control valve and a spool or logic control valve having an inlet port, an outlet port, a control port, a feedback port and an exhaust port. The inlet port is supplied with pressurized, filtered hydraulic fluid and the control port is supplied with pressurized hydraulic fluid from the solenoid control valve when it is energized. A valve spool having a pair of spaced-apart lands is biased toward the control port and feedback port by a spring. A feedback loop having a check valve communicates between the outlet port and the feedback port. The outlet port supplies controlled pressure and flow hydraulic fluid to the hydraulic control system.

Thus it is an object of the present invention to provide a hydraulic fluid supply system.

It is a further object of the present invention to provide a regulated hydraulic fluid supply system.

It is a still further object of the present invention to provide a regulated hydraulic fluid supply system for a dual clutch transmission.

It is a still further object of the present invention to provide a hydraulic fluid supply system having a feed limit valve.

It is a still further object of the present invention to provide a hydraulic fluid supply system having a feed limit valve for a dual clutch transmission.

It is a still further object of the present invention to provide a hydraulic fluid supply system having a feed limit valve with flow cut-off.

It is a still further object of the present invention to provide a hydraulic fluid supply system having a feed limit valve with flow cut-off for a dual clutch transmission.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
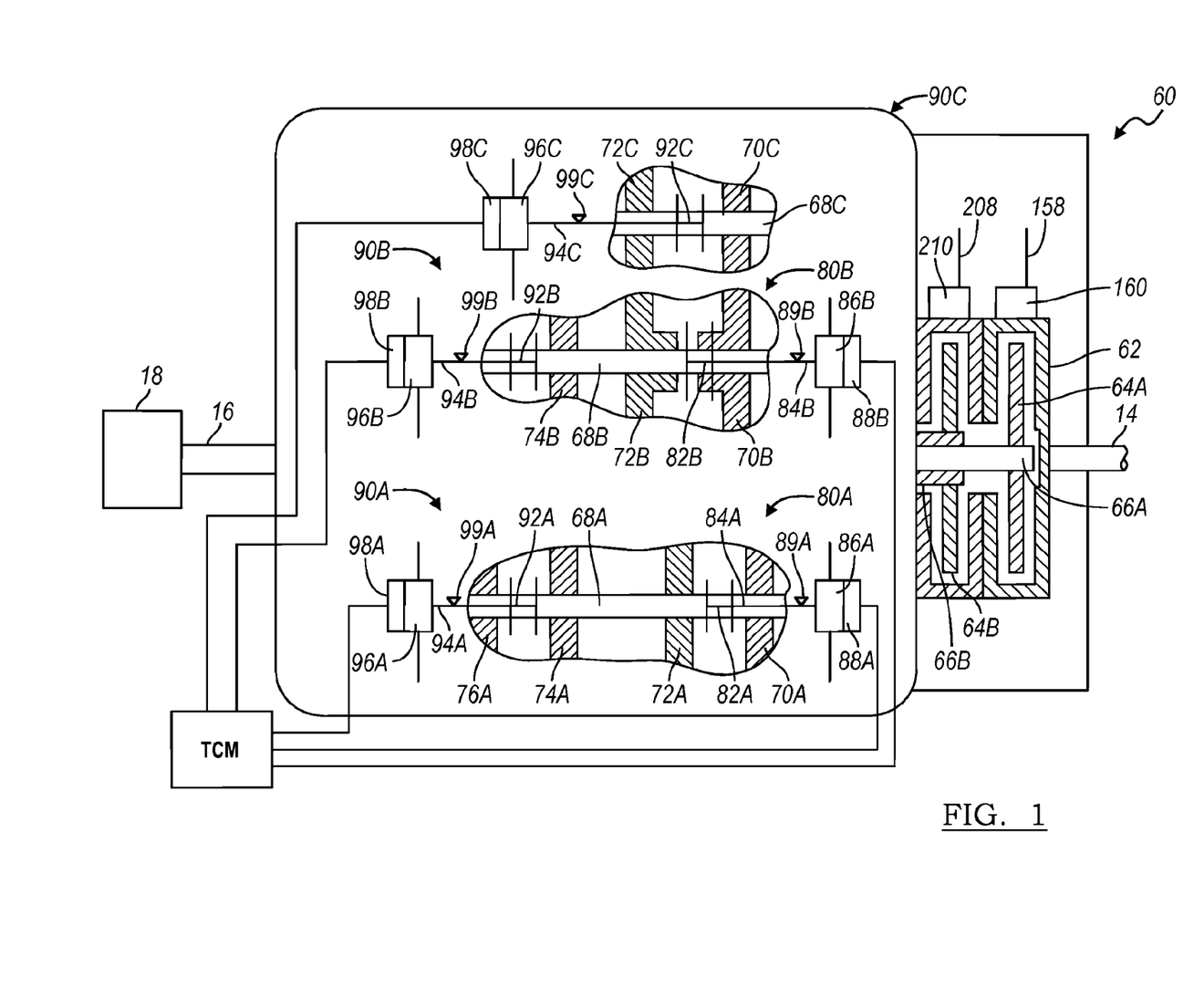
FIG. 1 is a pictorial view of an exemplary dual clutch automatic transmission with portions broken away incorporating a hydraulic fluid supply system according to the present invention.

With reference to FIG. 1, an exemplary dual clutch automatic transmission incorporating the present invention is illustrated and generally designated by the reference number 60. The dual clutch transmission 60 includes a typically cast, metal housing 12 which encloses and protects the various components of the transmission 60. The housing 12 includes a variety of apertures, passageways, shoulders and flanges (not illustrated) which position and support the components of the transmission 60. The transmission 60 includes an input shaft 14 which receives motive power from a prime mover (not illustrated) such as an internal combustion gas or Diesel engine or a hybrid or electric power plant and a single or double output shaft 16 which drives a final drive assembly 18 which may include a propshaft, a differential and drive axles. The input shaft 14 is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the driven gears 70B and 72B together. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages one of the gears 70C and 72C to the third countershaft 68C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It will be appreciated that other types of sensors, e.g., two and three position on-off sensors, and control strategies may also be utilized to determine the states and positions of the shift rail and forks assemblies 84A, 84B, 94A, 94B and 94C.

Additionally, a detent mechanism may be employed with each of the shift assemblies to assist obtaining and maintaining a gear or speed ratio once it is selected and assist obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, may, for example, include six forward speeds (or gears) and one or two reverse speeds (or gears) or five forward speeds and one or two reverse speeds.

It should be understood that while the present invention is directed to an active fluid pressure regulator and flow cut-off for a hydraulic control system for dual clutch transmissions, such systems are typically controlled by one or more microprocessors contained in a transmission control module TCM. Thus, the transmission control module TCM includes a plurality of inputs which receive data from, for example, the linear position sensors, memory, software and a plurality of outputs which control and modulate, for example, the positions of the clutches, shift rails and logic solenoid valves.

Figure 2A:
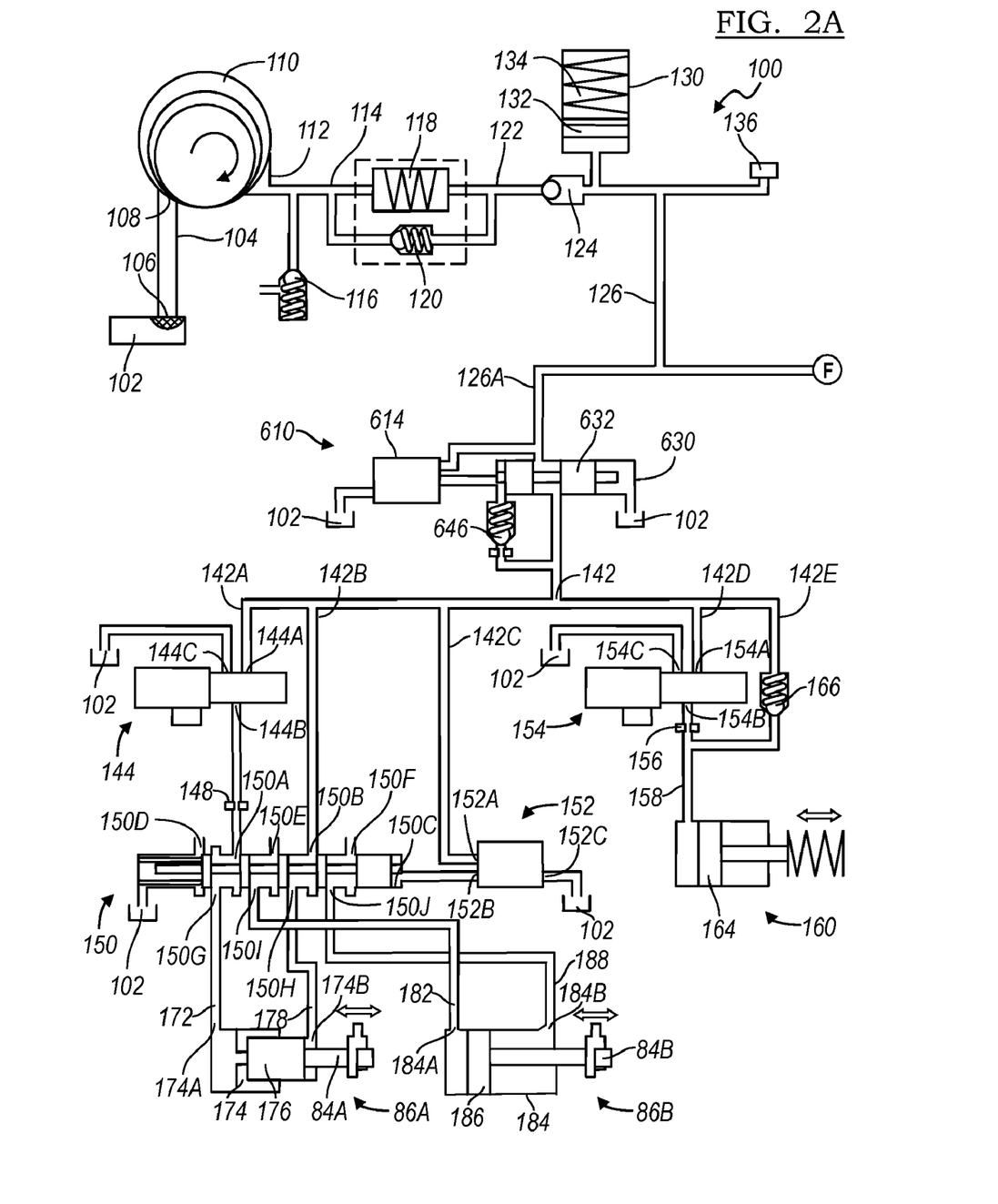
FIGS. 2A and 2B are schematic flow diagrams of an embodiment of a hydraulic control system incorporating a hydraulic fluid supply system according to the present invention for a dual clutch automatic transmission.
Figure 2B:
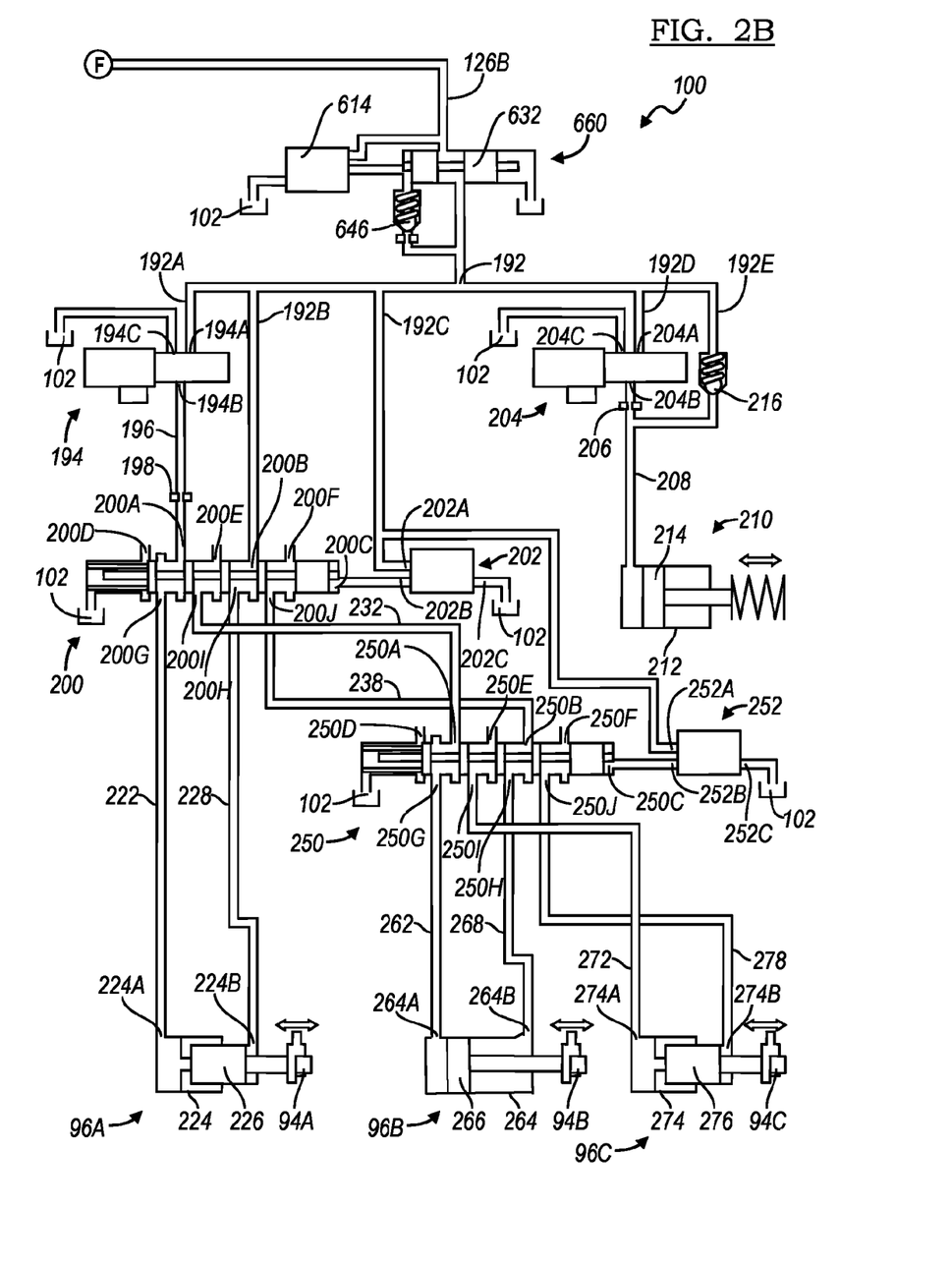

Referring now to FIGS. 1, 2A and 2B, an embodiment of a hydraulic control system for the dual clutch automatic transmission 60 described above is illustrated and designated by the reference number 100. The hydraulic control system 100 includes a sump 102 to which hydraulic fluid returns and collects from various components and regions of the automatic transmission 10. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 100, the check valve 120 opens to allow hydraulic fluid to bypass the filter 118. A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. It should be appreciated that other accumulator types can be utilized such as a gas filled piston accumulator.

In the embodiment of FIGS. 2A and 2B, the main supply line 126 branches or bifurcates into a first main supply line 126A and a second main supply line 126B. This initial bifurcation, before any gear or clutch selection or activation components, essentially splits the control system 100 into two separate control systems. This is advantageous from a control standpoint since if only one portion of the transmission 60 is active, it is possible for only the clutch and gears on one countershaft to be selected at any given time, without activation of the other portion of the transmission. This is also desirable from a failure mode standpoint since failure of a component in one portion of the transmission will affect only that portion of the transmission and the control system, the clutch and gears in the other portion of the transmission will, in all likelihood, still be available to provide limited operation and mobility.

The first main supply line 126A communicates with the first feed limit valve assembly 610 which is fully described below with reference to FIG. 3. The first feed limit valve assembly 610 supplies hydraulic fluid to a portion of the transmission 60 which provides, for example, the even-numbered gears: second, fourth and sixth. An outlet of the first feed limit valve assembly 610 communicates with a first manifold 142 having five branches. A first branch 142A of the first manifold 142 communicates with an inlet port 144A of a first pressure or flow control solenoid valve 144. When the pressure or flow control valve 144 is activated or energized, the inlet port 144A is in fluid communication with an outlet port 144B; when the pressure or flow control valve 144 is inactive or de-energized, the outlet port 144B is in fluid communication with an exhaust port 144C. The outlet port 144B is connected through a line 146 having a flow restricting orifice 148 to a first inlet port 150A of a first two position spool or logic valve 150. It should be understood that the incorporation or omission of flow restricting orifices in all the hydraulic lines of the hydraulic control system 100 is within the scope of the present invention. The locations and sizes of the flow restricting orifices are based on operational, software and algorithm requirements.

A second branch 142B of the first manifold 142 leads directly to a second inlet port 150B of a first logic valve 150. The first logic valve 150 also includes three exhaust ports 150D, 150E and 150F interleaved with the first inlet port 150A and the second inlet port 150B. The three exhaust ports 150D, 150E and 150F communicate with the sump 102 although such connection is not illustrated for reasons of clarity. A third branch 142C of the first manifold 142 connects to an inlet port 152A of a first two position (on-off) solenoid valve 152. An outlet port 152B of the first two position solenoid valve 152 communicates with a control port 150C at the end of the first logic valve 150. When the two position solenoid valve 152 is activated or energized, pressurized hydraulic fluid is supplied to the control port 150C of the first logic valve 150, translating the spool to the left as illustrated in FIG. 2A. When the two position solenoid valve 152 is inactive or de-energized, hydraulic fluid is exhausted through the control port 150C of the first logic valve 150, through the outlet port 152B and out an exhaust port 152C to the sump 102, allowing the spool of the first logic valve 150 to translate to the right. A fourth branch 142D of the first manifold 142 communicates with an inlet port 154A of a first electric pressure or flow clutch control solenoid valve 154. The first clutch control solenoid valve 154 also includes an outlet port 154B and an exhaust port 154C which communicates with the sump 102.

When the clutch control solenoid valve 154 is activated or energized, pressurized hydraulic fluid is provided through a flow control orifice 156 in a line 158 to a first clutch piston and cylinder assembly 160. Slidably disposed within a cylinder 162 is a single acting piston 164 which translates to the right in FIG. 2A under hydraulic pressure to engage the first input clutch 64A, illustrated in FIG. 1.

When the first clutch control solenoid valve 154 is de-energized, the inlet port 154A is closed and hydraulic fluid from the cylinder 162 passes from the outlet port 154B to the exhaust port 154C and into the sump 102. A fifth branch 142E of the first manifold 142 communicates with the output of a first clutch pressure limit control valve 166. If pressure within the first clutch piston and cylinder assembly 160 exceeds a predetermined pressure determined by the pressure control solenoid 140, the first pressure limit control valve 166 opens to relieve and reduce the pressure.

Returning to the first spool or logic valve 150, it also includes a first outlet port 150G which communicates through a line 172 to a port 174A at one end of the first shift actuator assembly 86A which includes a first cylinder or housing 174 and a first, preferably dual area piston 176 which is connected to the first shift rail and fork assembly 84A. The first shift actuator assembly 86A and the first shift rail and fork assembly 84A are, for example, associated with second and sixth gears. A port 174B at the other end of the cylinder 174 of the first shift actuator assembly 86A communicates through a line 178 to a third outlet port 150H. A second outlet port 150I communicates through a line 182 to a port 184A at one end of the second shift actuator assembly 86B which includes a housing or cylinder 184 and a piston 186 which is connected to the second shift rail and fork assembly 84B. The second shift actuator assembly 86B and the second shift rail and fork assembly 84B are, for example, associated with fourth gear. A port 184B at the other end of the cylinder 184 of the second shift actuator assembly 86A communicates through a line 188 to a fourth outlet port 150J.

Turning then to FIG. 2B and the second main supply line 126B, it communicates with a second feed limit valve assembly 660 which is fully described below with reference to FIG. 3. The second feed limit valve assembly 660 supplies hydraulic fluid to another portion of the transmission 60 which provides, for example, the odd-numbered gears: first, third, fifth and reverse. An outlet of the second feed limit valve assembly 660 communicates with a second manifold 192 having five branches. A first branch 192A of the second manifold 192 communicates with the inlet port 194A of a second electric pressure or flow control solenoid valve 194. When the second pressure or flow control valve 194 is energized, an inlet port 194A is in fluid communication with an outlet port 194B; when the second pressure or flow control valve 194 is de-energized, the outlet port 194B is in fluid communication with an exhaust port 194C. The outlet port 194B is connected through a line 196 having a flow restricting orifice 198 to a first inlet port 200A of a second two position spool or logic valve 200.

A second branch 192B of the second manifold 192 communicates with a second inlet port 200B of the second logic valve 200. The second spool or logic valve 200 also includes three exhaust ports 200D, 200E and 200F interleaved with the inlets ports 200A and 200B. The three exhaust ports 200D, 200E and 200F communicate with the sump 102. A third branch 192C of the second manifold 192 connects to an inlet port of 202A of the second two position (on-off) solenoid valve 202. An outlet port 202B of the second two position solenoid valve 202 communicates with a control port 200C at the end of the second logic valve 200. When the second two position solenoid valve 202 is energized, pressurized hydraulic fluid is supplied to the control port 200C, translating the spool of the second logic valve 200 to the left. When the second two position solenoid valve 202 is de-energized, hydraulic fluid is exhausted from the second logic valve 200, through the outlet port 202B and out an exhaust port 202C to the sump 102, allowing the spool to translate to the right. A fourth branch 192D of the second manifold 192 communicates with an inlet port 204A of a second electric pressure or flow clutch control solenoid valve 204. The second clutch control solenoid valve 204 also includes an outlet port 204B and an exhaust port 204C which communicates with the sump 102.

When the second clutch control solenoid valve 204 is energized, pressurized hydraulic fluid is provided through an orifice 206 in a line 208 to a second clutch piston and cylinder assembly 210. Slidably disposed within the cylinder 212 is a single acting piston 214 which translates under hydraulic pressure to the right in FIG. 3B to engage the second input clutch 64B, illustrated in FIG. 1. When the second clutch control solenoid valve 204 is de-energized, the inlet port 204A is closed off and hydraulic fluid from the cylinder 212 passes from the outlet port 204B to the exhaust port 204C and into the sump 102. A fifth branch 192E of the second manifold 192 communicates with the output of a clutch pressure limit control valve 216. If pressure within the second clutch piston and cylinder assembly 210 exceeds a predetermined pressure supplied by the pressure control solenoid 190, the pressure limit control valve 216 opens to relieve and reduce the pressure. It should be noted that the first and the second pressure limit control valves 166 and 216 can be eliminated depending upon various system and clutch control requirements.

The second spool or logic valve 200 also includes a first outlet port 200G which communicates through a line 222 to a port 224A at one end of the third, shift actuator assembly 96A which includes a third cylinder or housing 224 and a third, preferably dual area piston 226 which is connected to the third shift rail and fork assembly 94A. The third actuator assembly 96A and the third shift rail and fork assembly 94A may be associated with, for example, fifth and seventh gears. A port 224B at the other end of the cylinder 224 of the third shift actuator assembly 96A communicates through a line 228 to a third outlet port 200H.

A line 232 communicating with a second outlet port 200I of the second logic valve 200 is connected to a first inlet port 250A of a third spool or logic valve 250. A line 238 communicating with a fourth outlet port 200J of the second logic valve 200 is connected to a second inlet port 250B of a third spool or logic valve 250. Three exhaust ports 250D, 250E and 250F are interleaved with the first inlet port 250A and the second inlet port 250B. The three exhaust ports 250D, 250E and 250F communicate with the sump 102 although, for reasons of clarity, such connections are not illustrated. The third spool or logic valve 250 also includes a control port 250C at one end that communicates with an outlet port 252B of a third two position (on-off) solenoid valve 252. The third two position solenoid valve 252 includes an inlet port 252A which is in fluid communication with the third branch 192C of the second manifold 192 and an exhaust port 252C which communicates with the sump 102.

A first outlet port 250G communicates through a line 262 to a port 264A at one end of the fourth shift actuator assembly 96B which includes a fourth cylinder or housing 264 and a fourth piston 266 which is connected to the fourth shift rail and fork assembly 94B. The fourth shift actuator assembly 96B is a two position type and engages, for example, only third gear. A port 264B at the other end of the cylinder 264 of the fourth actuator assembly 96B communicates through a line 268 to a third outlet port 250H.

When the third two position (on-off) solenoid valve 252 is not energized, hydraulic fluid flows through the first and third outlet ports 250G and 250H as described, selecting third gear. When the third two position (on-off) solenoid valve 252 is energized, the spool of the third logic valve 250 translates to the left, as illustrated in FIG. 2B, and pressurized hydraulic fluid flows through a second outlet port 250I in a line 272 to a port 274A at one end of the fifth shift actuator assembly 96C which includes a fifth cylinder or housing 274 and a fifth, preferably dual area piston 276 which is connected to the fifth shift rail and fork assembly 94C. A port 274B at the other end of the cylinder or housing 274 communicates with a fourth outlet port 250J through a line 278. The fifth shift actuator assembly 90C engages, for example, either first or reverse gear. It will be appreciated that the pistons 176, 186, 226, 266 and 276 may all be either dual area pistons, if desired, or may all be single area pistons with appropriate associated feedback and control assemblies or combinations thereof, as illustrated.

Figure 3:
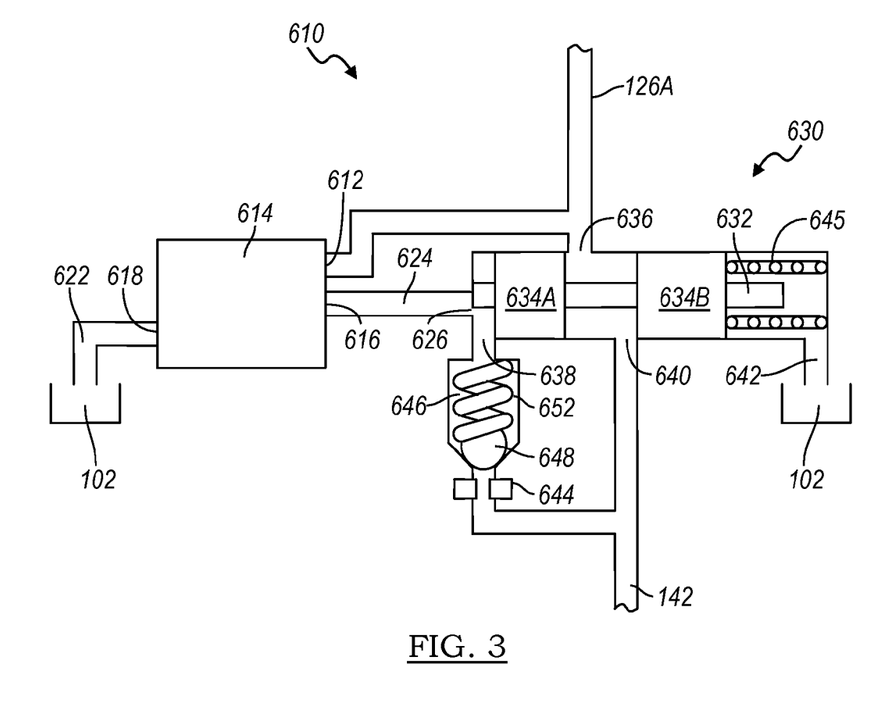
FIG. 3 is an enlarged, diagrammatic view of a feed limit valve with flow cut-off for a hydraulic fluid supply system according to the present invention.

Referring now to FIG. 3, the first feed limit valve assembly 610 will now be described. Since the first feed limit valve assembly 610 and second feed limit valve assembly 660 are identical, only the first feed limit valve assembly 610 will be explained in detail. The first feed limit valve assembly 610 receives pressurized hydraulic fluid in the first main supply line 126A. The line 126A bifurcates and one branch communicates with an inlet port 612 of a two position (on-off)

solenoid valve 614. The solenoid valve 614 includes an outlet port 616 which is in fluid communication with the inlet port 612 when the solenoid valve 614 is energized. The solenoid valve 614 also includes an exhaust port 618 which connects to the sump 102 through a line 622. When the solenoid valve 614 is de-energized, the outlet port 616 is in fluid communication with the exhaust port 618.

The outlet port 616 of the solenoid valve 614 is connected by a line 624 to a control port 626 of a multiple port control valve 630. The control valve 630 includes a spool 632 having two spaced-apart lands 634A and 634B. The following ports transfer oil around and through the control valve 630: the control port 626, an inlet port 636 which is connected to the first main supply line 126A, a feedback port 638, an outlet port 640 and an exhaust port 642 which communicates with the sump 102. A compression spring 645 which biases the spool 632 toward the control port 626 is disposed within the control valve 630 proximate the exhaust port 642. The outlet port 640 is connected to the first manifold 142 and, through a feedback loop including a flow restricting orifice 644, and a check valve 646 having, for example, a check ball 648 and a compression spring 652, with the feedback port 638. The compression spring 652 biases the check ball 648 toward the orifice 644 such fluid flow from the feedback port 638 to the first manifold 142 is prohibited but fluid flow from the first manifold 142 to the feedback port 638 is possible if the pressure differential across the check ball 648 is high enough to overcome the bias of the compression spring 652. Depending upon operational conditions and considerations, the compression spring 652 may be omitted without operational degradation. Furthermore, since the control port 626 and the feedback port 638 feed into a common chamber of the control valve 630, adjacent the land 634A, the line 624 and the output of the check valve 646 may be combined and a single (common) control and feedback port may be utilized rather than the individual ports 626 and 638 illustrated.

In operation, the first and second feed limit valve assemblies 610 and 660 provide improved flow and pressure control to the other components of the hydraulic control system 100. With reference to the first feed limit valve assembly 610, in its relaxed state, as illustrated in FIG. 3, flow from the main supply line 126A passes through the control valve 630 between the lands 634A and 634B and out to the first manifold 142. As hydraulic pressure in the system builds as, for example, actuators move and fill, the pressure will increase at the end of the check valve 646 proximate the orifice 644, unseating it and hydraulic fluid will flow through the feedback port 638. This action translates the valve spool 632 to the right, closing off flow to the inlet port 636 or the outlet port 640 (depending on valve design) and the first manifold 126 or 142. Thus, the pressure delivered to the first manifold 142 can be controlled. Additionally, if the side of the transmission 60 associated with the control valve 610 is to be inoperative, for example, while the other side of the transmission 60 is operating, the solenoid valve 614 is energized to provide hydraulic fluid to the control port 626 to translate the valve spool 632 to the right to close off fluid flow between the inlet port 636 and the outlet port 640. In this operating mode, the check valve 646 prevents the fluid pressure provided to the control port 626 (and the feedback port 638) from being communicated to the first manifold 142 and the other components of the system.

It will be appreciated that the active feed limit valve and flow cut-off assembly for hydraulic control systems achieves improvements in reduced energy consumption as well as shift performance that is rapid, positive and efficient without overshoot and wasted energy.

The description of the invention is merely exemplary in nature and variations that do not depart from the gist of the invention are intended to be within the scope of the invention. Such variations may include, but are not limited to, piston configuration, logic valve design and the arrangement of hydraulic lines connecting the valves and shift actuators which may be varied widely so long as system operation and functionality are maintained. Such variations are not to be regarded as departures from the spirit and scope of the present invention.

What is claimed is

1. A hydraulic fluid supply system for a hydraulic control system comprising, in combination, a pump, and an accumulator having an output, a control valve having an inlet port communicating with said accumulator output, an outlet port and a control port, a valve spool and a compression spring for translating said valve spool toward said control port, a check valve communicating between said outlet port and said control port for permitting fluid flow from said outlet port to said control port and inhibiting fluid flow from said control port to said outlet port, and a solenoid valve having an inlet communicating with said accumulator output, an outlet communicating with said control port and an exhaust port, whereby increasing fluid pressure in said control port translates said valve spool against said spring to close off fluid flow between said inlet port and said outlet port.

2. claim 1: A hydraulic fluid supply system for a hydraulic control system claim 1 further including a flow restricting orifice disposed between said outlet port and said check valve.

3. The hydraulic fluid supply system for a hydraulic control system of claim 1 further including a sump and wherein said pump has an inlet in fluid communication with said sump.

4. The hydraulic fluid supply system for a hydraulic control system of claim 1 wherein said solenoid valve has two positions.

5. The hydraulic fluid supply system for a hydraulic control system of claim 1 wherein said pump is an electric gear pump.

6. The hydraulic fluid supply system for a hydraulic control system of claim 1 wherein said pump is engine driven.

7. The hydraulic fluid supply system for a hydraulic control system of claim 1 wherein said spring is a compression spring.

8. The hydraulic fluid supply system for a hydraulic control system of claim 1 further including a pressure transducer in fluid communication with said output of said accumulator.

9. A hydraulic fluid supply system for a hydraulic control system comprising, in combination, a pump, and an accumulator having an output, a spool valve having an inlet port communicating with said accumulator output, an outlet port, a control port, a feedback port, a valve spool and a spring for translating said valve spool toward said control port, a check valve communicating between said outlet port and said feedback port for permitting fluid flow from said outlet port to said control port and inhibiting fluid flow from said feedback port to said outlet port, and a solenoid valve having an inlet communicating with said accumulator output, an outlet communicating with said control port and an exhaust port, whereby increasing fluid pressure in said control port translates said valve spool against said compression spring to close off fluid flow between said inlet port and said outlet port.

10. The hydraulic fluid supply system for a hydraulic control system of claim 9 wherein said check valve includes a spring.

11. The hydraulic fluid supply system for a hydraulic control system of claim 9 wherein said pump is one of a gear pump and gerotor pump.

12. the hydraulic fluid supply system for a hydraulic control system of claim 9 wherein said solenoid valve is a two position valve.

13. The hydraulic fluid supply system for a hydraulic control system of claim 9 further including a flow restricting orifice disposed between said outlet port and said check valve.

14. The hydraulic fluid supply system for a hydraulic control system of claim 9 further including a pressure transducer in fluid communication with said output of said accumulator.

15. A hydraulic fluid supply system comprising, in combination, a pump, and an accumulator having an output, a control valve having an inlet port communicating with said accumulator output, an outlet port and a control port, a valve spool having lands defining a first chamber providing communication between said inlet port and said outlet port and a second chamber in communication with said control port and a compression spring for translating said valve spool toward said control port, a check valve communicating between said outlet port and said control port for permitting fluid flow from said outlet port to said control port and inhibiting fluid flow from said control port to said outlet port, and a solenoid valve having an inlet communicating with said accumulator output, an outlet communicating with said control port and an exhaust port, whereby increasing fluid pressure in said control port translates said valve spool against said compression spring to close off fluid flow between said inlet port and said outlet port.

16. The hydraulic fluid supply system of claim 15 wherein said check valve includes a spring.

17. The hydraulic fluid supply system of claim 15 wherein said pump is one of a gear pump and a gerotor pump.

18. The hydraulic fluid supply system of claim 15 wherein said solenoid valve is a two position valve.

19. The hydraulic fluid supply system of claim 15 further including a feedback port in said control valve in fluid communication with said second chamber and said check valve.

\* \* \* \* \*